United States Patent
Dube

(10) Patent No.: US 11,282,524 B2
(45) Date of Patent: Mar. 22, 2022

(54) TEXT-TO-SPEECH MODELING

(71) Applicant: Capital One Services, LLC, McLean, VA (US)

(72) Inventor: Abhishek Dube, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/948,629

(22) Filed: Sep. 25, 2020

(65) Prior Publication Data

US 2021/0056972 A1    Feb. 25, 2021

Related U.S. Application Data

(63) Continuation of application No. 16/545,989, filed on Aug. 20, 2019, now Pat. No. 10,789,956.

(51) Int. Cl.
| | |
|---|---|
| *G10L 15/26* | (2006.01) |
| *G10L 15/06* | (2013.01) |
| *G06N 20/00* | (2019.01) |
| *G10L 13/02* | (2013.01) |

(52) U.S. Cl.
CPC .............. *G10L 15/26* (2013.01); *G06N 20/00* (2019.01); *G10L 13/02* (2013.01); *G10L 15/063* (2013.01)

(58) Field of Classification Search
CPC .............................. G10L 15/26; G10L 15/265
See application file for complete search history.

(56) References Cited

U.S. PATENT DOCUMENTS

| | | | |
|---|---|---|---|
| 7,092,888 B1 * | 8/2006 | McCarthy | G10L 15/063 |
| | | | 379/88.01 |
| 7,376,586 B1 | 5/2008 | Partovi et al. | |
| 8,165,883 B2 | 4/2012 | Galanes et al. | |
| 8,345,835 B1 | 1/2013 | Or-Bach et al. | |
| 8,411,828 B2 | 4/2013 | Ashton et al. | |
| 8,949,124 B1 | 2/2015 | Wooters | |
| 10,789,956 B1 | 9/2020 | Dube | |
| 2004/0230637 A1 | 11/2004 | Lecoueche et al. | |
| 2009/0052636 A1 * | 2/2009 | Webb | G10L 15/26 |
| | | | 379/88.14 |
| 2011/0202344 A1 * | 8/2011 | Meyer | G10L 13/02 |
| | | | 704/260 |
| 2013/0231935 A1 * | 9/2013 | Meyer | G10L 13/033 |
| | | | 704/260 |
| 2015/0170638 A1 * | 6/2015 | Bezar | G10L 15/02 |
| | | | 704/246 |

* cited by examiner

*Primary Examiner* — Michael N Opsasnick
(74) *Attorney, Agent, or Firm* — Harrity & Harrity, LLP

(57) ABSTRACT

A device may receive a set of audio data files corresponding to a set of calls, wherein the set of audio data files includes digital representations of one or more segments of respective calls of the set of calls, and wherein the set of calls includes audio data relating to a particular industry. The device may receive a set of transcripts corresponding to the set of audio data files. The device may determine a plurality of text-audio pairs within the set of calls, wherein a text-audio pair, of the plurality of text-audio pairs, comprises: a digital representation of a segment a call of the set of calls, and a corresponding excerpt of text from the set of transcripts. The device may train, using a machine learning process, an industry-specific text-to-speech model, tailored for the particular industry, based on the plurality of text-audio pairs.

20 Claims, 10 Drawing Sheets

500 ─▶

510 — Receive a set of audio data files corresponding to a set of calls, wherein the set of audio data files includes digital representations of one or more segments of respective calls of the set of calls, and wherein the set of calls includes audio data relating to a particular industry 520 — Determine a plurality of text-audio pairs within the set of calls wherein a text-audio pair, of the plurality of text-audio pairs, comprises a digital representation of a segment of a call of the set of calls and a corresponding excerpt of text transcribed from the call 530 — Train, using a machine learning process, an industry-specific text-to-speech model, that is tailored for the particular industry, based on the plurality of text-audio pairs

FIG. 5

TEXT-TO-SPEECH MODELING

RELATED APPLICATION

This application is a continuation of U.S. patent application Ser. No. 16/545,989, filed Aug. 20, 2019 (now U.S. Pat. No. 10,789,956), which is incorporated herein by reference.

BACKGROUND

A text-to-speech model can be used to translate text to a corresponding audio output. For example, a device may input text into the text-to-speech model to obtain information for a corresponding audio output.

SUMMARY

According to some implementations, a method may include receiving, by a device, a set of audio data files corresponding to a set of calls, wherein the set of audio data files includes digital representations of one or more segments of respective calls of the set of calls, and wherein the set of calls includes audio data relating to a particular industry; receiving, by the device, a set of transcripts corresponding to the set of audio data files; determining, by the device, a plurality of text-audio pairs within the set of calls, wherein a text-audio pair, of the plurality of text-audio pairs, comprises: a digital representation of a segment of a call of the set of calls, and a corresponding excerpt of text from the set of transcripts; and training, by the device and using a machine learning process, an industry-specific text-to-speech model, that is tailored for the particular industry, based on the plurality of text-audio pairs.

According to some implementations, a device may include one or more memories; and one or more processors, communicatively coupled to the one or more memories, configured to: receive a set of audio data files corresponding to a set of calls, wherein the set of audio data files includes digital representations of one or more segments of respective calls of the set of calls, and wherein the set of calls includes audio data relating to a particular industry; determine a plurality of text-audio pairs within the set of calls, wherein a text-audio pair, of the plurality of text-audio pairs, comprises: a digital representation of a segment of a call of the set of calls, and a corresponding excerpt of text transcribed from the call; and train, using a machine learning process, an industry-specific text-to-speech model, that is tailored for the particular industry, based on the plurality of text-audio pairs.

According to some implementations, a non-transitory computer-readable medium may store one or more instructions. The one or more instructions, when executed by one or more processors of a device, may cause the one or more processors to: receive a set of data corresponding to a set of calls relating to a particular industry, wherein the set of data comprises: digital representations of one or more segments of respective calls of the set of calls, and a set of transcripts corresponding to the one or more segments of the respective calls; determine a plurality of text-audio pairs within the set of data, wherein a text-audio pair, of the plurality of text-audio pairs, comprises: a digital representation of a segment of the one or more segments of the respective calls, and a corresponding text from the set of transcripts; and train, using a machine learning process, an industry-specific text-to-speech model, to be used for calls relating to the particular industry, based on the plurality of text-audio pairs.

BRIEF DESCRIPTION OF THE DRAWINGS

FIGS. 4-6 are flowcharts of example processes for training a text-to-speech model.

DETAILED DESCRIPTION

Figure 1A:
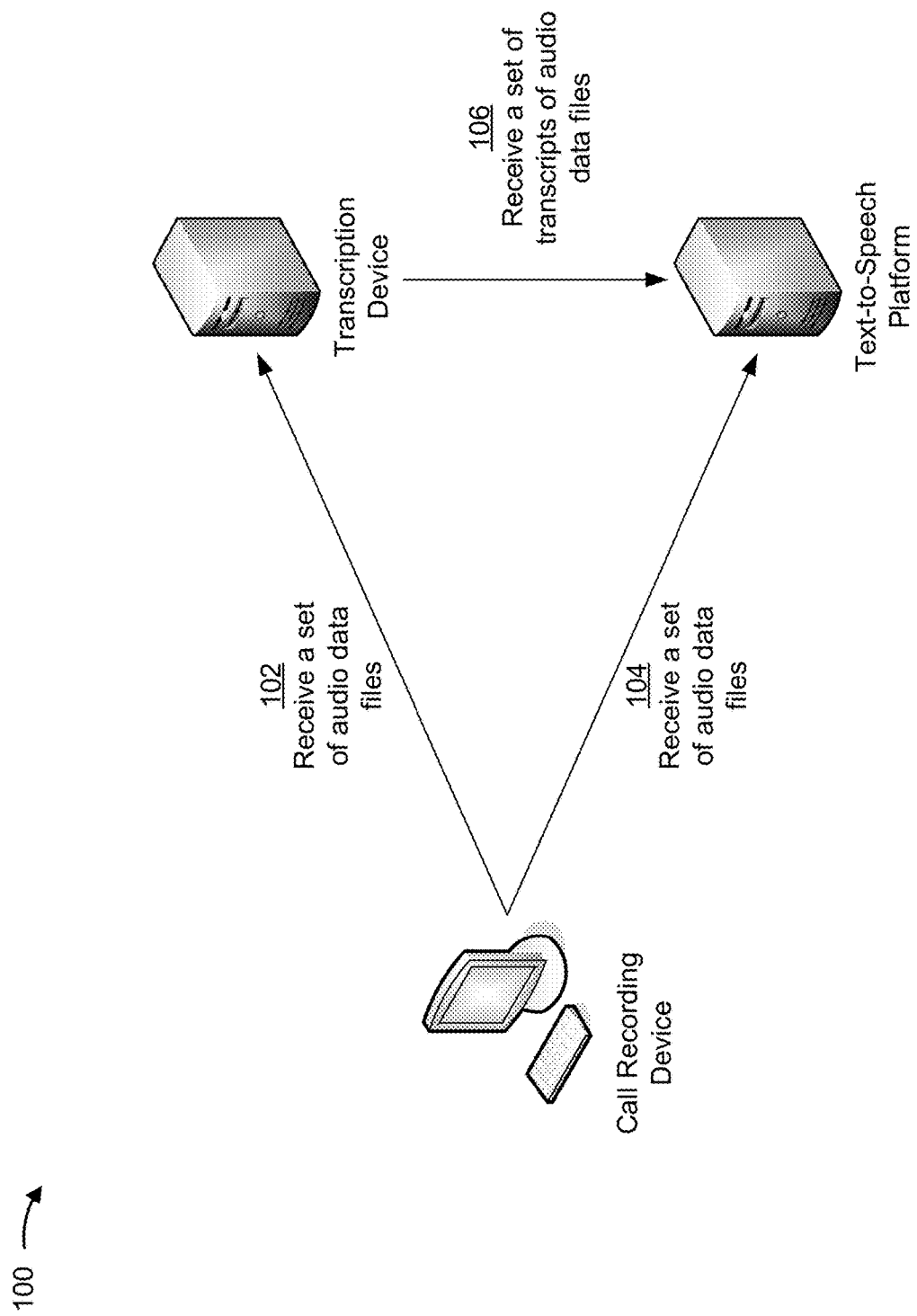
FIGS. 1A-1E are diagrams of one or more example implementations described herein.

The following detailed description of example implementations refers to the accompanying drawings. The same reference numbers in different drawings may identify the same or similar elements.

A text-to-speech model may be helpful to provide audio output based on corresponding text. To train a text-to-speech model, a device may use audio data and a transcript of the audio data to pair segments of audio data with segments of the transcript. The device may then apply a machine learning process to the pairs to generate the text-to-speech model.

However, a significant amount of audio data is needed to produce enough vocabulary and associated data to train the text-to-speech model. Generally, at least 20 hours of audio data is used to train a simple, generic text-to-speech model. Obtaining this audio data generally involves a person reading a body of text in a recording studio for 20 or more hours. This process of obtaining the audio data can consume significant computing resources of recording and processing equipment.

According to some implementations described herein, a device may train a text-to-speech model using audio data from a set of calls (e.g., phone calls, video chats, and/or the like). The set of calls may include audio data relating to a particular industry. In some implementations, the set of calls include audio data related to industry-specific vocabulary. The set of calls may include calls to or from a call center associated with the particular industry. For example, the set of calls may include calls to or from a call center of a business entity within the particular industry.

The calls to or from the call center may be filtered by operators associated with respective calls. For example, a set of calls may be selected based on being associated with a same operator. In this way, the text-to-speech model may be trained based on a single operator's voice. This may improve the training process based on a consistency among audio data of the set of calls.

In some implementations, calls are already recorded for security, personnel training, record keeping, and/or the like, so no additional speech recordings would be needed to train the text-to-speech model. By using audio data from a set of calls to train a text-to-speech model, computing resources (e.g., processor resources, memory resources, communication resources, and/or the like) may be conserved that would otherwise be used to record, process, store, and/or transfer audio data obtained via a dedicated recording process.

Additionally, by using audio data from a set of calls relating to a particular industry, the text-to-speech model may be trained using industry-specific vocabulary. In this way, the text-to-speech model can be tailored for the particular industry. This can improve accuracy of the information output from the text-to-speech model, which may conserve computing resources that might otherwise be consumed by recovery processes related to errors in the information output from the text-to-speech model. For example, improved accuracy may help to avoid an error in the information output from the text-to-speech model, which may otherwise cause incorrect information to be provided to a user. If incorrect information is provided to the user, the user may then provide another query based on the incorrect information, contact an associated business entity additional times, escalate an issue associated with an original query, and/or the like, all of which would consume significant computing resources.

A device used to train the text-to-speech model, or an associated device, may use the text-to-speech model to translate text into information for a corresponding audio output. In some implementations, the device may receive text for translation from a server device, use the text-to-speech model to generate information for a corresponding audio output, and provide the information to the server device and/or another device.

In some implementations, the device may receive a query (e.g., as text, audio data, a text-based translation of audio data, and/or the like) from a client device (e.g., a user device), determine a response to the query, use the text-to-speech model to generate information for audio output corresponding to the response, and provide the information to the client device.

In some implementations, a device implementing a virtual assistant may use the text-to-speech model to respond to textual or audible queries by a user interacting with the virtual assistant. In this way, the virtual assistant may also be tailored for the particular industry and thereby reduce errors in audio output by the virtual assistant. This may conserve computing resources that might otherwise be used for recovering from errors, as described above.

In some implementations, a device implementing an interactive voice response (IVR) system may use the text-to-speech model to communicate to a client device engaged in a call with the device, a business entity associated with the device, and/or the like. In this way, the IVR system may also be tailored for the particular industry and thereby reduce errors in audio information provided by the IVR system to the client device. This may conserve computing resources that might otherwise be used for recovering from errors, as described above.

FIGS. 1A-1E are diagrams of one or more example implementations 100 described herein. As shown in FIGS. 1A-1E, the example implementation(s) 100 may include a call recording device, a transcription device, a text-to-speech platform, a server device, a client device, and/or the like.

The call recording device may be associated with a telephone or other device that facilitates a call. The call recording device may record calls that are inbound and/or outbound calls between an operator and another user. The calls may be associated with a call center. In some implementations, the call center may be associated with an entity (e.g., a business, a regulatory body, and/or the like) that operates within a particular industry. For example, the call recording device may record calls to or from a phone operator at a call center of a business within the particular industry. In some implementations, the call recording device may be associated with a third-party call center that provides a call reception service (e.g., customer service, sales, and/or the like) for an entity that operates within the particular industry. In this way, the recorded calls have an increased likelihood of including audio data corresponding to industry-specific vocabulary. This may conserve computing resources that would otherwise be consumed executing one or more recovery processes related to errors in information output from a text-to-speech model, as described below.

As shown in FIG. 1A, and by reference number 102, a transcription device may receive a first set of audio data files from the call recording device. Audio data files of the first set of audio data files may include digital representations of one or more segments of respective calls of a set of calls. The set of calls may include audio data relating to a particular industry.

In some implementations, the transcription device may input the first set of audio data files into a speech-to-text model and output a set of transcripts of the first set of audio data files. In some implementations, the transcription device may provide the first set of audio data files (e.g., via a speaker) to a user and generate the transcript based on input received from the user. In some implementations, the transcription device may use a speech-to-text model to generate a provisional transcript and present the provisional transcript to a user for review and/or revisions.

As shown by reference number 104, the text-to-speech platform may receive a second set of audio data files, from the call recording device, corresponding to the set of calls. The audio data files of the second set of audio data files may include digital representations of one or more segments of respective calls of the set of calls. In some implementations, the set of calls includes audio data relating to a particular industry. The second set of audio data files received by the text-to-speech platform may include more, less, different, or the same audio data as the first set of audio data files received by the transcription device from the call recording device. In some implementations, the second set of audio data files and the first set of audio data files relate to a same set of calls.

In some implementations, the second set of audio data files may include audio data from at least 20 hours of calls. In some implementations, the second set of audio data files may include audio data from at least 30 hours calls. In some implementations, the second set of audio data files may include audio data from fewer than 100 hours of calls. In some implementations, the second set of audio data files may include audio data from between 30 and 100 hours of calls As shown by reference number 106, the text-to-speech platform may receive the set of transcripts of the first set of audio data files from the transcription device. The set of transcripts, generated based on the first set of audio data files, may correspond to the second set of audio data files.

A transcript of the first set of audio data files may be segmented into words, phrases, sentences, and/or the like. In some implementations, the transcript of the first set of audio data files may include an excerpt of text and an identification of a corresponding segment of audio data. For example, the transcript of the first set of audio data files may include an excerpt of text along with a time stamp to indicate a time, in a corresponding audio data file of the second set of audio data files, of a corresponding segment of audio data in the second set of audio data files. This may facilitate a determination of text-audio pairs between the segments of text and segments of audio data.

In some implementations, the text-to-speech platform may receive the second set of audio data files via the transcription device. For example, the second set of audio data files may be the same as the first set of audio data files and may be provided to the text-to-speech platform, via the transcription device, before or with the transcript of the first set of audio data files.

Figure 1B:
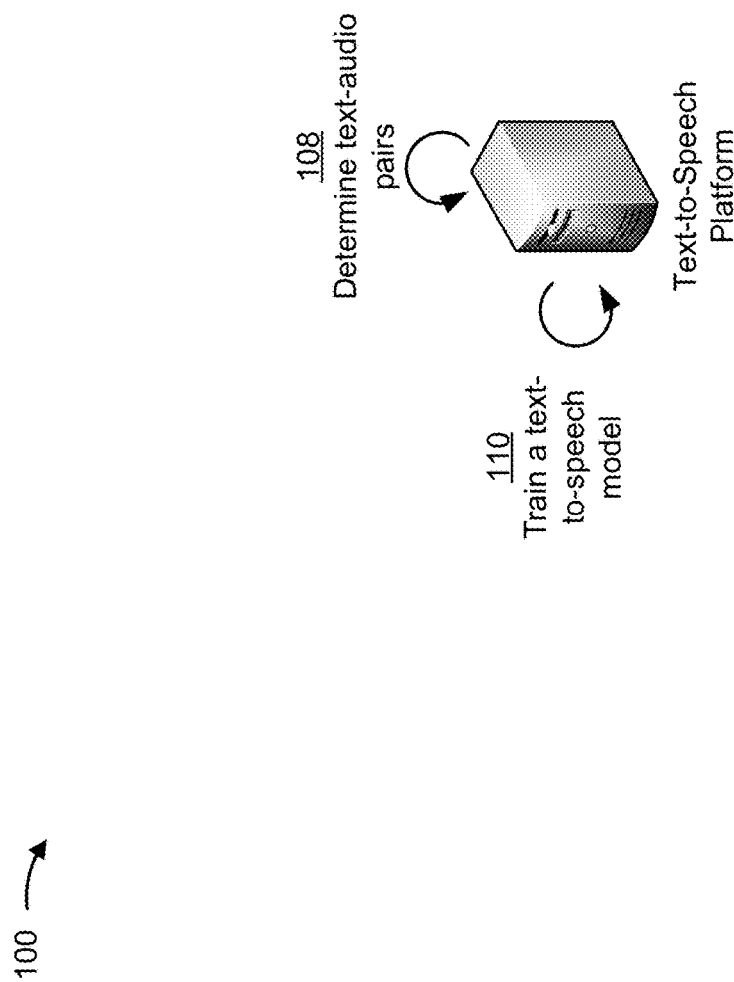

As shown in FIG. 1B, and by reference number 108, the text-to-speech platform may determine a plurality of text-audio pairs within the set of calls. A text-audio pair may include a digital representation of a segment of a call of the set of calls and a corresponding excerpt, or segment, of text from the set of transcripts. One or more of the text-audio pairs may correspond to an industry-specific vocabulary.

In some implementations, when determining the plurality of text-audio pairs, the text-to-speech platform may associate an excerpt of text with a corresponding segment of audio data of the calls. For example, the text-to-speech platform may associate the excerpt of text with the corresponding segment of audio data using an identification of a segment of audio data that corresponds to an excerpt of text. In some implementations, the identification may be included with a transcript of the set of transcripts.

In some implementations, the text-to-speech platform may identify one or more segments, of the set of calls, that are associated with speech by a phone operator (e.g., of a call center). The text-to-speech platform may identify the one or more segments based on an identification of a speaker, or a device used by the speaker, associated with the one or more segments of the calls, which identification may be included in the set of transcripts. The text-to-speech platform may identify the one or more segments based on patterns within the audio data files.

The text-to-speech platform may determine the plurality of text-audio pairs for the segments associated with the speech by the phone operator. In some implementations, the text-to-speech platform may not determine text-audio pairs for segments associated with one or more other speakers on the set of calls. In some implementations, the text-to-speech platform may discard text-audio pairs for segments associated with one or more speakers on the set of calls. In this way, the text-to-speech platform may train a text-to-speech model based on text-audio pairs for the segments associated with the speech by the phone operator, which may improve the accuracy of the text-to-speech model and conserve computing resources that would otherwise be used to train the text-to-speech model based on text-audio pairs for segments associated with speech of other operators and/or other speakers on the set of calls.

As shown by reference number 110, the text-to-speech platform may train a text-to-speech model. The text-to-speech model may be an industry-specific text-to-speech model that is tailored for the particular industry. The text-to-speech model may be an industry-specific text-to-speech model based on the text-to-speech platform training the text-to-speech model using the plurality of text-audio pairs from a set of calls relating to the particular industry. The text-audio pairs, used to train the text-to-speech model, may include one or more text-audio pairs corresponding to industry-specific vocabulary.

As described herein, the text-to-speech platform may use one or more artificial intelligence techniques, such as machine learning, deep learning, and/or the like to train and/or generate a text-to-speech model.

In some implementations, the text-to-speech platform may parse natural language contained in information provided to the text-to-speech platform (e.g., the set of transcripts and/or the audio data files) to determine context of a text-audio pair associated with portions of the information. For example, the text-to-speech platform may obtain data identifying, within the information and in natural language, a description of context for the text-audio pair, and may parse the data to identify parameters associated with the context.

In some implementations, the text-to-speech platform may determine context of a text-audio pair based on one or more characteristics of a segment of audio data in the text-audio pair, an excerpt of text in the text-audio pair, text near the excerpt of text in a corresponding transcript, and/or audio data near the segment of audio data in a corresponding call. For example, based on the corresponding excerpt of text, and surrounding text being "Would you like to know more about cash-back credit cards?", the text-to-speech platform may use natural language processing to determine that a characteristic of the excerpt of text, "credit cards", is that the excerpt of text is associated with a question, an end of a sentence, a modifier "cash-back", and/or the like. In this case, the text-to-speech platform may determine that a natural language text corresponds to a characteristic based on data relating to surrounding text and/or audio data, data identifying characteristics of the excerpt of text, and/or the like.

In this way, the text-to-speech platform may identify characteristics associated with excerpts of text, as described herein. Based on applying a rigorous and automated process associated with determining context of an excerpt of text, the text-to-speech platform enables recognition and/or identification of thousands or millions of parameters of context for thousands or millions of excerpts of text, thereby increasing an accuracy and consistency of determining context of an excerpt of text relative to requiring computing resources to be allocated for hundreds or thousands of technicians to manually determine context of an excerpt of text of the thousands or millions excerpts of text in the set of calls.

In some implementations, the text-to-speech platform may train the text-to-speech model using information that includes a plurality of text-audio pairs, context of the plurality of text-audio pairs, and/or the like. As an example, the text-to-speech platform may determine that a digital representation of a segment of a call corresponds to an excerpt of text from a transcript of the call. The text-to-speech model may determine context of the segment of the call and/or the corresponding excerpt of text to determine when the text-to-speech model should output information corresponding to the segment of the call as output when an input matches the excerpt of text. For example, the information corresponding to the segment of the call, or information based at least in part on the information, may be output when the context of the excerpt of text is associated with a threshold probability of being associated with a context of the input. In some implementations, the text-to-speech platform may use a scoring system (e.g., with relatively high scores and/or relatively low scores) to identify and/or classify contexts as being associated with one another. In this case, the text-to-speech platform may determine that a relatively high score (e.g., as being likely to be identified) is to be assigned to context parameters that are determined to be the same or similar as previously identified context parameters of an excerpt of text or nearby text in a transcript (or more frequently identified than past identified context parameters). In contrast, the text-to-speech platform may determine that a relatively low score (e.g., as being unlikely to be identified) is to be assigned to context parameters of an excerpt of text or nearby text that are determined to be different than past identified context parameters of the particular excerpt of text input into the text-to-speech model (or less frequently identified than past identified context parameters).

In some implementations, the text-to-speech platform may perform a data preprocessing operation when generating the model of the text-to-speech model. For example, the text-to-speech platform may preprocess data (e.g., a set of audio data files, a set of corresponding transcripts, and/or the like) to remove noise, non-speech, speech by one or more speakers on a call (e.g., speakers other than an operator common for the set of calls), non-ASCII characters, white spaces, confidential data (e.g., personal account information, health information, and/or the like), and/or the like. In this way, the text-to-speech platform may organize thousands, millions, or billions of data items for machine learning and model generation.

In some implementations, the text-to-speech platform may perform one or more operations when generating the text-to-speech model. For example, the text-to-speech platform may portion text-audio pairs into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the text-to-speech platform may preprocess and/or perform dimensionality reduction to reduce a quantity of text-audio pairs, when a relatively high quantity of text-audio pairs relate to a same excerpt of text, to a minimum feature set. In some implementations, the text-to-speech platform may train the text-to-speech model on this minimum feature set, thereby reducing processing to train the machine learning model, and may apply a classification technique, to the minimum feature set.

In some implementations, the text-to-speech platform may use a classification technique, such as a logistic regression classification technique, a random forest classification technique, a gradient boosting machine learning (GBM) technique, and/or the like, to determine a categorical outcome (e.g., that text of an input matches a text-audio pair of the text-to-speech model, that text of an input does not match a text-audio pair of the text-to-speech model, and/or the like). Additionally, or alternatively, the text-to-speech platform may use a naïve Bayesian classifier technique. In this case, the text-to-speech platform may perform binary recursive partitioning to split the data of the minimum feature set into partitions and/or branches and use the partitions and/or branches to perform predictions (e.g., that text of an input does or does not match a text-audio pair of the text-to-speech model). Based on using recursive partitioning, the text-to-speech platform may reduce utilization of computing resources relative to manual, linear sorting and analysis of data items, thereby enabling use of thousands, millions, or billions of data items to train a model, which may result in a more accurate model than using fewer data items.

Additionally, or alternatively, the text-to-speech platform may use a support vector machine (SVM) classifier technique to generate a non-linear boundary between data items in the training set. In this case, the non-linear boundary is used to classify test data (e.g., data relating to an input text) into a particular class (e.g., a class indicating that the input text matches a text-audio pair of the text-to-speech model, a class indicating that the input text does not match a text-audio pair of the text-to-speech model, and/or the like).

Additionally, or alternatively, the text-to-speech platform may train the text-to-speech model using a supervised training procedure that includes receiving input to the model from a subject matter expert, which may reduce an amount of time, an amount of processing resources, and/or the like to train the text-to-speech model relative to an unsupervised training procedure. In some implementations, the text-to-speech platform may use one or more other model training techniques, such as a neural network technique, a latent semantic indexing technique, and/or the like. For example, the text-to-speech platform may perform an artificial neural network processing technique (e.g., using a two-layer feedforward neural network architecture, a three-layer feedforward neural network architecture, and/or the like) to perform pattern recognition with regard to patterns of whether input text described using different semantic descriptions can be used to match the input text to a text-audio output or not. In this case, using the artificial neural network processing technique may improve an accuracy of a model (e.g., the text-to-speech model) generated by the text-to-speech platform by being more robust to noisy, imprecise, or incomplete data, and by enabling the text-to-speech platform to detect patterns and/or trends undetectable to human analysts or systems using less complex techniques.

As an example, the text-to-speech platform may use a supervised multi-label classification technique to train the model. For example, as a first step, the text-to-speech platform may map context to a text-audio pair. In this case, a digital representation of a segment of a call of the text audio pair may be associated with the context and an analysis of the context (e.g., by a technician, thereby reducing processing relative to the text-to-speech platform being required to analyze each activity). As a second step, the text-to-speech platform may determine classifier chains, whereby labels of target variables may be correlated (e.g., in this example, labels may be context parameters and correlation may refer to a common or similar digital representation of the text audio pair. In this case, the text-to-speech platform may use an output of a first label as an input for a second label (as well as one or more input features, which may be other data relating to the excerpts of text), and may determine a likelihood that particular context parameters that include a set of characteristics (some of which are associated with a particular digital representation of a text-audio pair and some of which are not associated with the particular digital representation of the text-audio pair) are associated with the particular digital representation of the text-audio pair based on a similarity to other context parameters that include similar characteristics. In this way, the text-to-speech platform transforms classification from a multilabel-classification problem to multiple single-classification problems, thereby reducing processing utilization. As a third step, the text-to-speech platform may determine a Hamming Loss Metric relating to an accuracy of a label in performing a classification by using the validation set of the data. For example, an accuracy with which a weighting applied to each context parameter or characteristic and whether each context parameter or characteristic is associated with a digital representation of a text-audio pair or not, results in a correct prediction of whether an input text matches with a text-audio pair, thereby accounting for differing amounts to which association of any one context parameter or characteristic influences whether an input text matches with a text-audio pair. As a fourth step, the text-to-speech platform may finalize the model based on labels that satisfy a threshold accuracy associated with the Hamming Loss Metric and may use the model for subsequent prediction of whether context parameters of an input text are matched to a digital representation of a text audio pair, and whether the input text can be translated into information corresponding to an audio output.

In some implementations, a different device, such as a server device, may generate and train the model. The different device may send the model for use by the text-to-speech platform. The different device may update and send (e.g., on a scheduled basis, on an on-demand basis, on a triggered basis, on a periodic basis, and/or the like) the model to the text-to-speech platform.

Accordingly, the text-to-speech platform may use any number of artificial intelligence techniques, machine learning techniques, deep learning techniques, and/or the like to generate a text-to-speech model, determine whether an input text matches a text-audio pair, output information for an audio output corresponding to an input text, and/or the like.

After training the text-to-speech model, the text-to-speech platform may provide the text-to-speech model to another device. For example, the text-to-speech platform may provide the text-to-speech model to a device of an entity of the particular industry. In this way, computing resources may be conserved, which may otherwise be used to record, process, store, and/or transfer audio data obtained via a dedicated recording process and then generate a speech-to-text model based on the audio data obtained via a dedicated recording process. Additionally, computing resources of the device of the entity of the particular industry, and/or associated devices, may be conserved, which may otherwise have been used to recover from providing incorrect information for audio output based on a text-to-speech model that is not tailored for the particular industry.

In other examples, the text-to-speech platform may provide the text-to-speech model to a client device. In some implementations, the client device may use the text-to-speech model via an application programming interface (API). For example, a client device may install a banking application with a virtual assistant, which is configured to receive instruction from the banking application and/or a query from a user and respond to the instruction and/or query with an audible response. The text-to-speech model may operate to translate received text (e.g., received from a component of the client device) into a corresponding audio output for use by the virtual assistant in providing the audible response. In this way, the client device may utilize the advantages of the industry-specific text-to-speech model while conserving computing resources that would otherwise be used to communicate text for translation, or a query, to the text-to-speech platform and to receive information for an audio output in response.

In some implementations, the text-to-speech platform may receive text for translation to a corresponding audio output, input the text to the text-to-speech model to obtain information for the corresponding audio output, and then train a speech-to-text model based on the information for the corresponding audio output generated by the text-to-speech model. In this way, computing resources may be conserved, which may otherwise have been used to provide audio data files to a transcription device and receive corresponding transcripts for future calls.

Figure 1C:
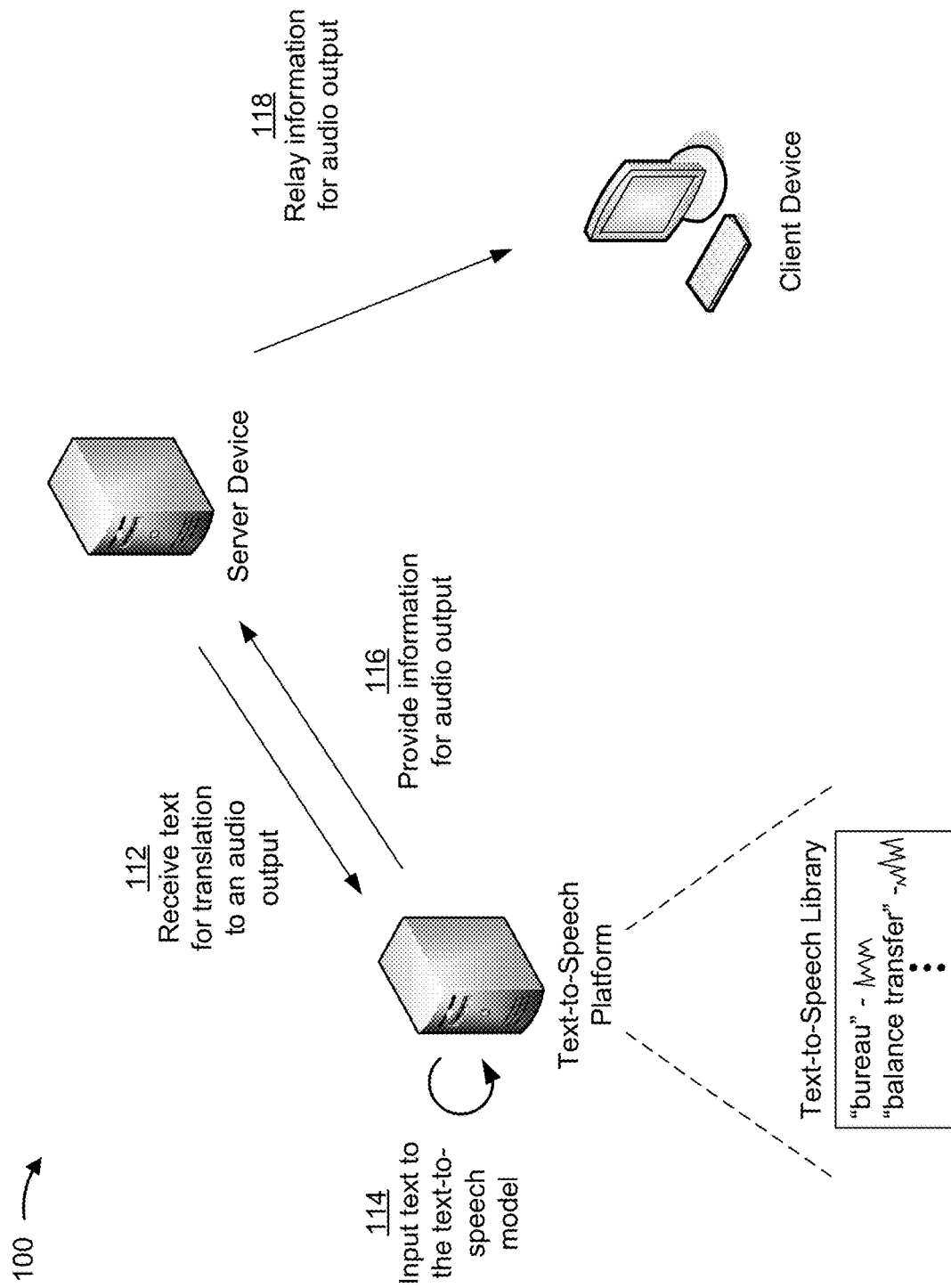

As shown in FIG. 1C, and by reference number 112, the text-to-speech platform may receive, from a server device, text for translation to a corresponding audio output. The text from the server device may correspond to information to provide to another device, such as a client device. In some implementations, the client device may provide a query to the server device, which determines a response to the query in text-form and provides the response to the query to the text-to-speech platform for translation to a corresponding audio output.

The description with regard to FIG. 1C will describe the text-to-speech platform as using the text-to-speech model to translate text to a corresponding audio output. In some implementation, as mentioned above with regard to FIG. 1B, the text-to-speech platform may provide the text-to-speech model to another device, such as the server device, and this other device may use the text-to-speech model to translate text to a corresponding audio output without communicating with the text-to-speech model.

As shown by reference number 114, the text-to-speech platform may input the received text to the text-to-speech model to obtain information for the corresponding audio output. For example, the text-to-speech platform may use a text-to-speech library associated with the text-to-speech model to translate excerpts of text, from the received text, into information for audio output. The text-to-speech library may be selected from a plurality of text-to-speech libraries. In some implementations, the text-to-speech library may be selected from a plurality of text-to-speech libraries so that the audio output is similar in dialect, rate of speech, tone, language, and/or the like of the user. In some implementations, the text-to-speech library may be selected from a plurality of text-to-speech libraries so that the audio output is similar in dialect, rate of speech, tone, language, and/or the like of people in the region where the user is located.

In some implementations, if the received text includes one or more excerpts of text for which corresponding information for audio output is not included in the text-to-speech platform, the text-to-speech platform may determine alternative phrasing and/or vocabulary, using excerpts of text stored in the text-to-speech library, to express a same or substantially similar meaning as that contained in the received text.

As shown by reference number 116, the text-to-speech platform may provide, to the server device, the information for the corresponding audio output. As shown by reference number 118, the server device may relay the information for the corresponding audio output to the client device. In this way, the server device may conserve resources, which may otherwise be used to recover from errors from generating corresponding audio output with a generic text-to-speech module.

In some implementations, the text-to-speech platform may provide the information to the client device without providing the information to the server device. For example, the server device may provide an identification of the client device with the text for translation, such that the text-to-speech platform may provide the information to the client device without first routing the information through the server device. In this way, computing resources may be conserved, which may otherwise be used to route the information in an inefficient path to the client device.

Figure 1D:
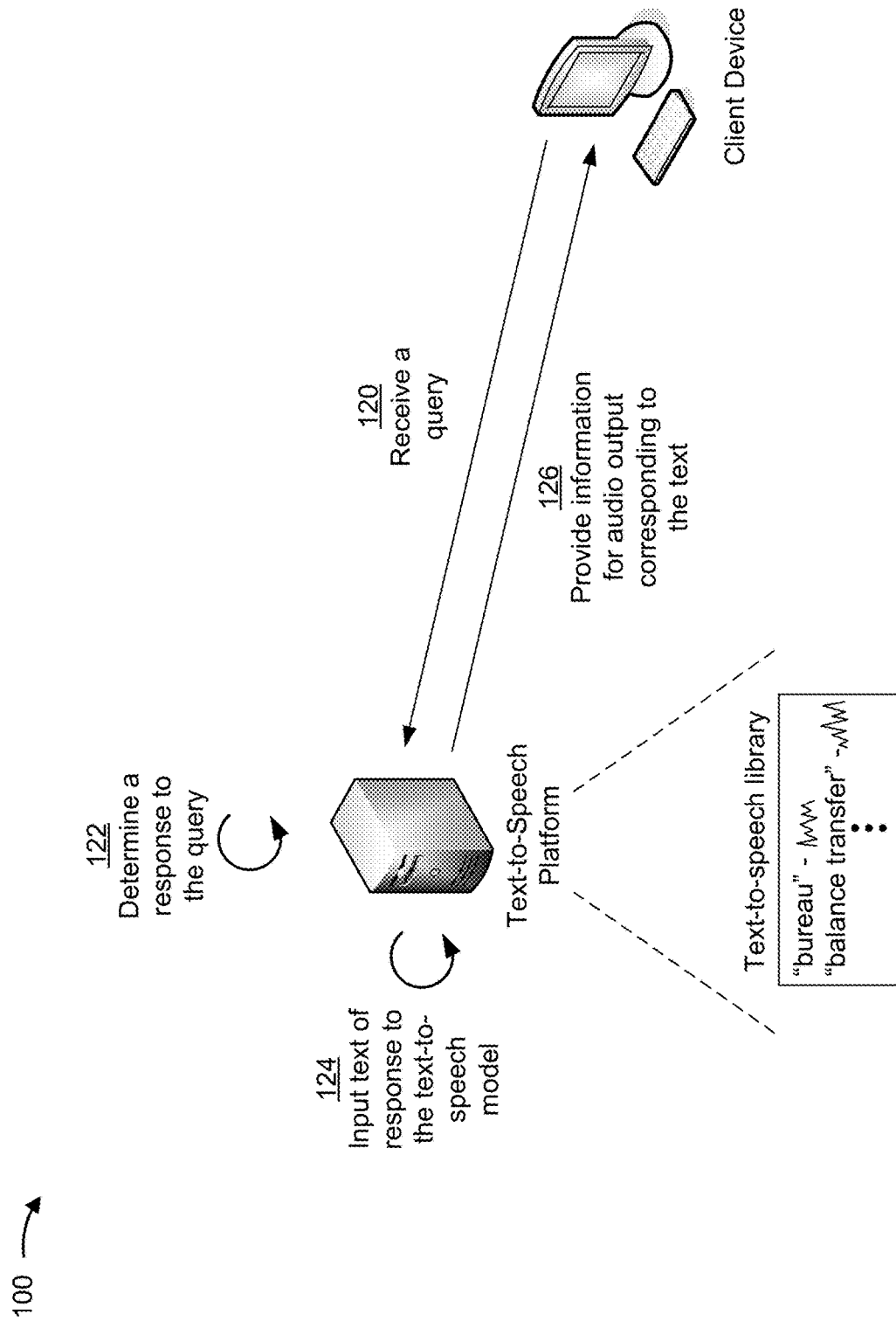

As shown by FIG. 1D, and by reference number 120, the text-to-speech platform may receive a query from a client device. In some implementations, the query may be a text-based query. In some implementations, the query may include a digital representation of an audio input received from a user. For example, a virtual assistant may receive an audio input from a user in which the user asks a question or provides a command. In some of these implementations, the text-to-speech platform may transcribe the digital representation of the audio input into text using a speech-to-text model. In some implementations, the client device or another device may transcribe the audio input from the user using a speech-to-text model before providing the query to the text-to-speech platform as a text-based query.

As shown by reference number 122, the text-to-speech platform may determine a response to the query. The response to the query may include a text-based reply. In some implementations, the text-to-speech platform may search a database for an answer to a question in the query.

In some implementations, the text-to-speech platform may query another device, such as a server device, to determine a response to the query.

In some implementations, the query may be associated with a user account that is associated with the text-to-speech platform. For example, the text-to-speech platform may be associated with an entity in the particular industry. The query may request information related to a user account for which the client device has provided credentials to a device of the entity. The text-to-speech platform may determine that the client device has provided valid credentials to receive information related to the user account. The text-to-speech platform may then determine the response to the query by accessing the information of the user account.

As shown by reference number 124, text-to-speech platform may input the text-based reply to the text-to-speech model to obtain information for an audio output corresponding to the text-based reply. In some implementations, the text-to-speech model may use a text-to-speech library to translate one or more excerpts of text into information for an audio output. The text-to-speech library may be selected from a plurality of text-to-speech libraries. In some implementations, the text-to-speech library may be selected from a plurality of text-to-speech libraries so that the audio output is similar in dialect, rate of speech, tone, language, and/or the like of the user. In some implementations, the text-to-speech library may be selected from a plurality of text-to-speech libraries so that the audio output is similar in dialect, rate of speech, tone, language, and/or the like of people in the region where the user is located.

As shown by reference number 126, the text-to-speech platform may provide, to the client device, the information for the audio output corresponding to the text. In this way, the text-to-speech platform may provide information for the audio output based on the text-to-speech model that is tailored for the particular industry relevant to the query and conserve computing resources that may otherwise be used by recovery processes related to errors in the information output from a generic text-to-speech model.

In some implementations, the operations shown in FIG. 1D may include operations relating to a live call. In some implementations, the client device may be a phone or other device capable of facilitating a call between the client device and an entity associated with the text-to-speech platform. The client device may initiate a call to, or accept a call from, the entity associated with the text-to-speech platform. The client device may receive an audible query from a user of the client device and provide, to the text-to-speech platform, associated information as a query. In some implementations, the text-to-speech platform may receive the associated information as audio data and transcribe the audio data into text using a speech-to-text model. In some implementations, the text-to-speech platform may receive a transcript of the audible query from another device, such as the client device or a server device.

The text-to-speech platform may determine a response to the query, as described above, and then input text of the response to the text-to-speech model to obtain information for an audio output corresponding to the text-based reply. The text-to-speech platform may then provide, to the client device, the information for the audio output. The information for the audio output may be configured to be presented by a speaker of the client device.

Figure 1E:
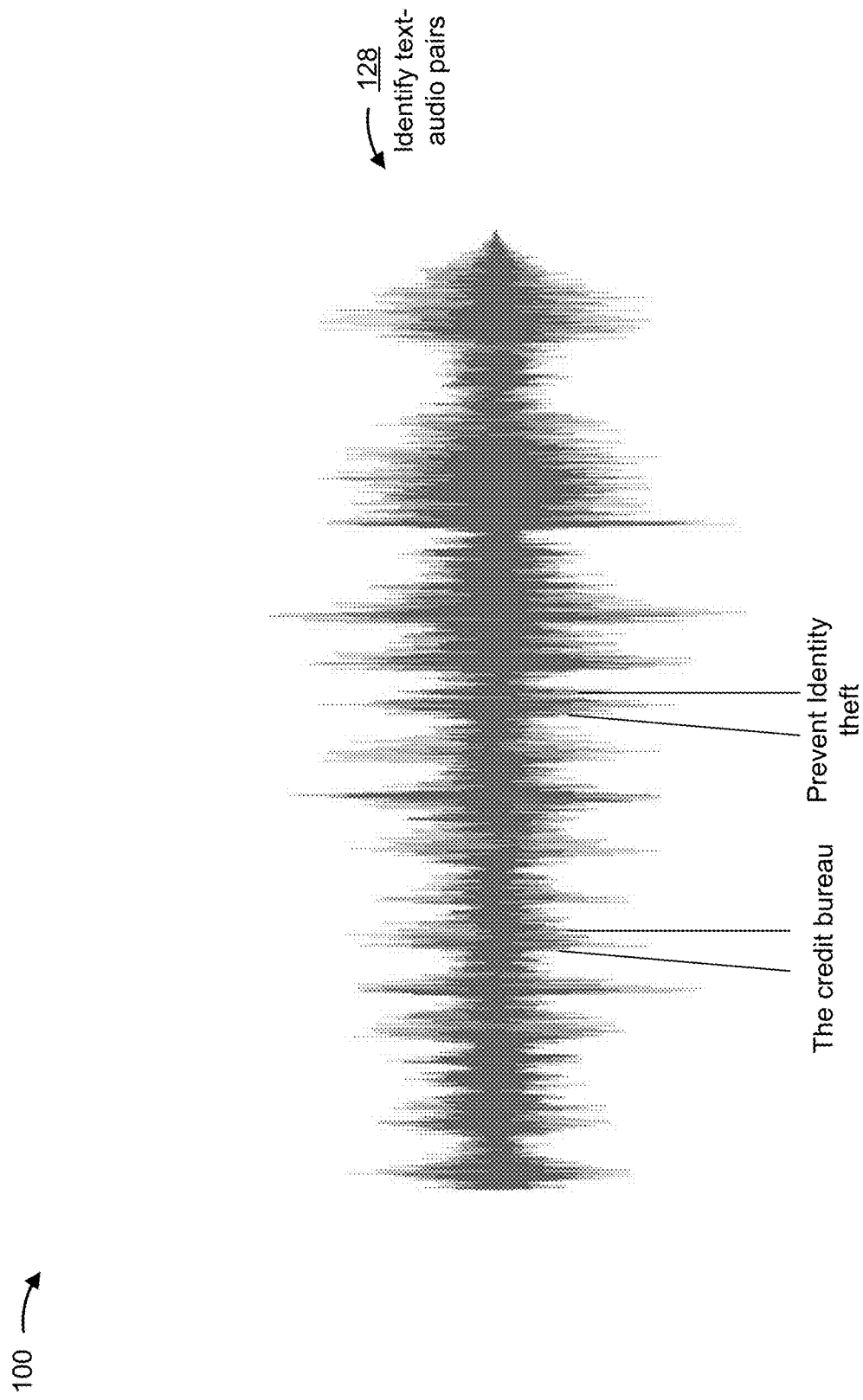

As shown in FIG. 1E, and by reference number 128, the text-to-speech platform may identify text-audio pairs between a segment of a waveform of audio data and an excerpt of a corresponding transcript. In some implementations, the text-to-speech platform uses information within the transcript to identify a segment of the wave form that corresponds to an excerpt of text within the transcript. For example, the transcript may provide one or more time stamps associated with an excerpt of text to indicate where, in the corresponding set of calls, a corresponding waveform is located.

As indicated above, FIGS. 1A-1E are provided as one or more examples. Other examples may differ from what is described with regard to FIGS. 1A-1E.

Figure 2:
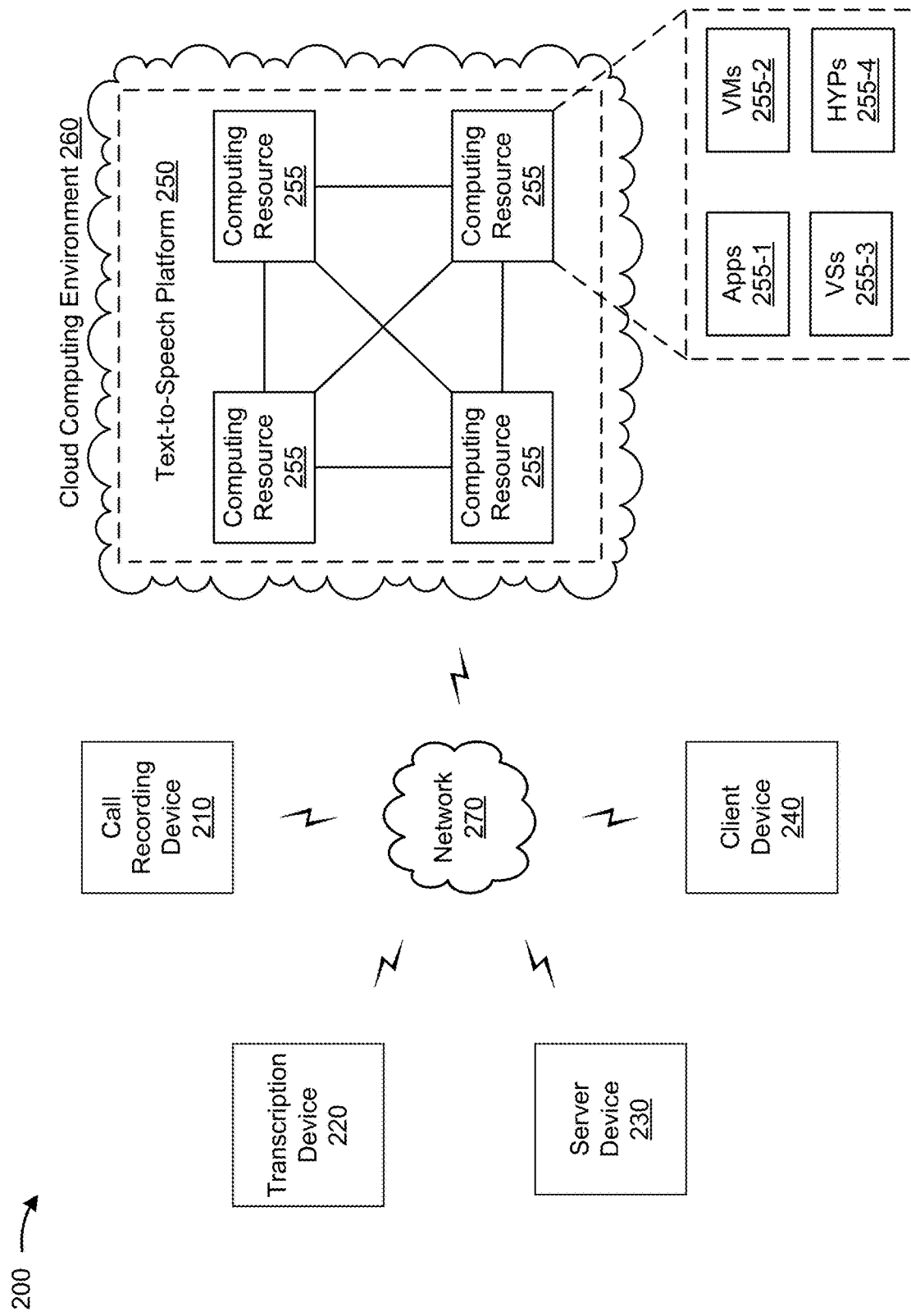
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a call recording device 210, a transcription device 220, a server device 230, a client device 240, a text-to-speech platform 250 that may use computing resources 255 in a cloud computing environment 260, a network 270, and/or the like. Devices of environment 200 may interconnect via wired connections, wireless connections, or a combination of wired and wireless connections.

Call recording device 210 includes one or more devices capable of recording, receiving, generating, storing, processing, and/or providing information associated with a call. For example, call recording device 210 may include a communication and/or computing device, such as a telephone, a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Transcription device 220 includes one or more devices capable of storing, processing, and/or routing information associated with transcribing a set of audio data files, such as digital representations of one or more segments of a call. In some implementations, transcription device 220 may implement, or have access to, a speech-to-text model for performing a transcript. In some implementations, transcription device 220 may include a communication and/or computing device, such as a telephone, a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device. In some implementations, transcription device 220 may include a communication interface that allows transcription device 220 to receive information from and/or transmit information to other devices in environment 200.

Server device 230 includes one or more devices capable of storing, processing, and/or routing information associated with communicating a query, audio data, text for translation, information for audio output, and/or the like among the devices of FIG. 2 and/or other devices. In some implementations, server device 230 may include a communication interface that allows server device 230 to receive information from and/or transmit information to other devices in environment 200.

Client device 240 includes one or more devices capable of receiving, generating, storing, processing, and/or providing information associated with providing a query, receiving information for an audio output, and/or providing the audio output. For example, client device 240 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Text-to-speech platform 250 includes one or more computing resources assigned to implement the text-to-speech model. For example, text-to-speech platform 250 may be a platform implemented by cloud computing environment 260 that may store and/or use the text-to-speech model. In some implementations, text-to-speech platform 250 is implemented by computing resources 255 of cloud computing environment 260.

Text-to-speech platform 250 may include a server device or a group of server devices. In some implementations, text-to-speech platform 250 may be hosted in cloud computing environment 260. Notably, while implementations described herein may describe text-to-speech platform 250 as being hosted in cloud computing environment 260, in some implementations, text-to-speech platform 250 may be non-cloud-based or may be partially cloud-based.

Cloud computing environment 260 includes an environment that delivers computing as a service, whereby shared resources, services, and/or the like may be provided to text-to-speech platform 250. Cloud computing environment 260 may provide computation, software, data access, storage, and/or other services that do not require end-user knowledge of a physical location and configuration of a system and/or a device that delivers the services. As shown, cloud computing environment 260 may implement text-to-speech platform 250 and include computing resource 255.

Computing resource 255 includes one or more personal computers, workstation computers, server devices, or another type of computation and/or communication device. In some implementations, computing resource 255 may host text-to-speech platform 250. The cloud resources may include compute instances executing in computing resource 255, storage devices provided in computing resource 255, data transfer devices provided by computing resource 255, and/or the like. In some implementations, computing resource 255 may communicate with other computing resources 255 via wired connections, wireless connections, or a combination of wired and wireless connections.

As further shown in FIG. 2, computing resource 255 may include a group of cloud resources, such as one or more applications ("APPs") 255-1, one or more virtual machines ("VMs") 255-2, virtualized storage ("VSs") 255-3, one or more hypervisors ("HYPs") 255-4, or the like.

Application 255-1 includes one or more software applications that may be provided to or accessed by client device 240. Application 255-1 may eliminate a need to install and execute the software applications on client device 240. For example, application 255-1 may include software associated with text-to-speech platform 250 and/or any other software capable of being provided via cloud computing environment 260. In some implementations, one application 255-1 may send/receive information to/from one or more other applications 255-1, via virtual machine 255-2.

Virtual machine 255-2 includes a software implementation of a machine (e.g., a computer) that executes programs like a physical machine. Virtual machine 255-2 may be either a system virtual machine or a process virtual machine, depending upon use and degree of correspondence to any real machine by virtual machine 255-2. A system virtual machine may provide a complete system platform that supports execution of a complete operating system ("OS"). A process virtual machine may execute a single program and may support a single process. In some implementations, virtual machine 255-2 may execute on behalf of a user (e.g., client device 240, and may manage infrastructure of cloud computing environment 260, such as data management, synchronization, or long-duration data transfers.

Virtualized storage 255-3 includes one or more storage systems and/or one or more devices that use virtualization techniques within the storage systems or devices of computing resource 255. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 255-4 provides hardware virtualization techniques that allow multiple operating systems (e.g., "guest operating systems") to execute concurrently on a host computer, such as computing resource 255. Hypervisor 255-4 may present a virtual operating platform to the "guest operating systems" and may manage the execution of the guest operating systems. Multiple instances of a variety of operating systems may share virtualized hardware resources.

Network 270 includes one or more wired and/or wireless networks. For example, network 270 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
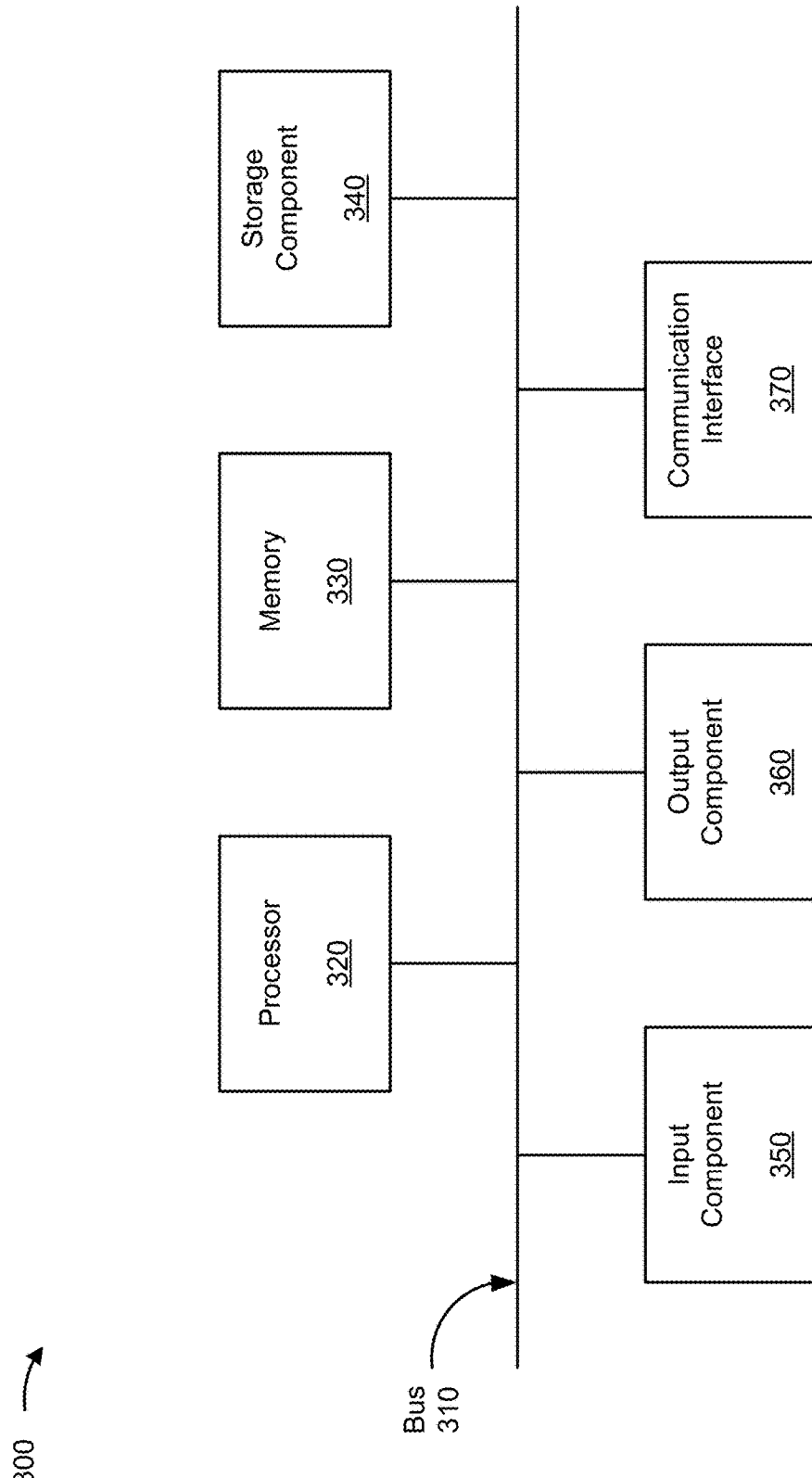
FIG. 3 is a diagram of example components of one or more devices of FIG. 2.

FIG. 3 is a diagram of example components of a device 300. Device 300 may correspond to call recording device 210, transcription device 220, server device 230, client device 240, text-to-speech platform 250, and/or computing resource 255. In some implementations, call recording device 210, transcription device 220, server device 230, client device 240, text-to-speech platform 250, and/or computing resource 255 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
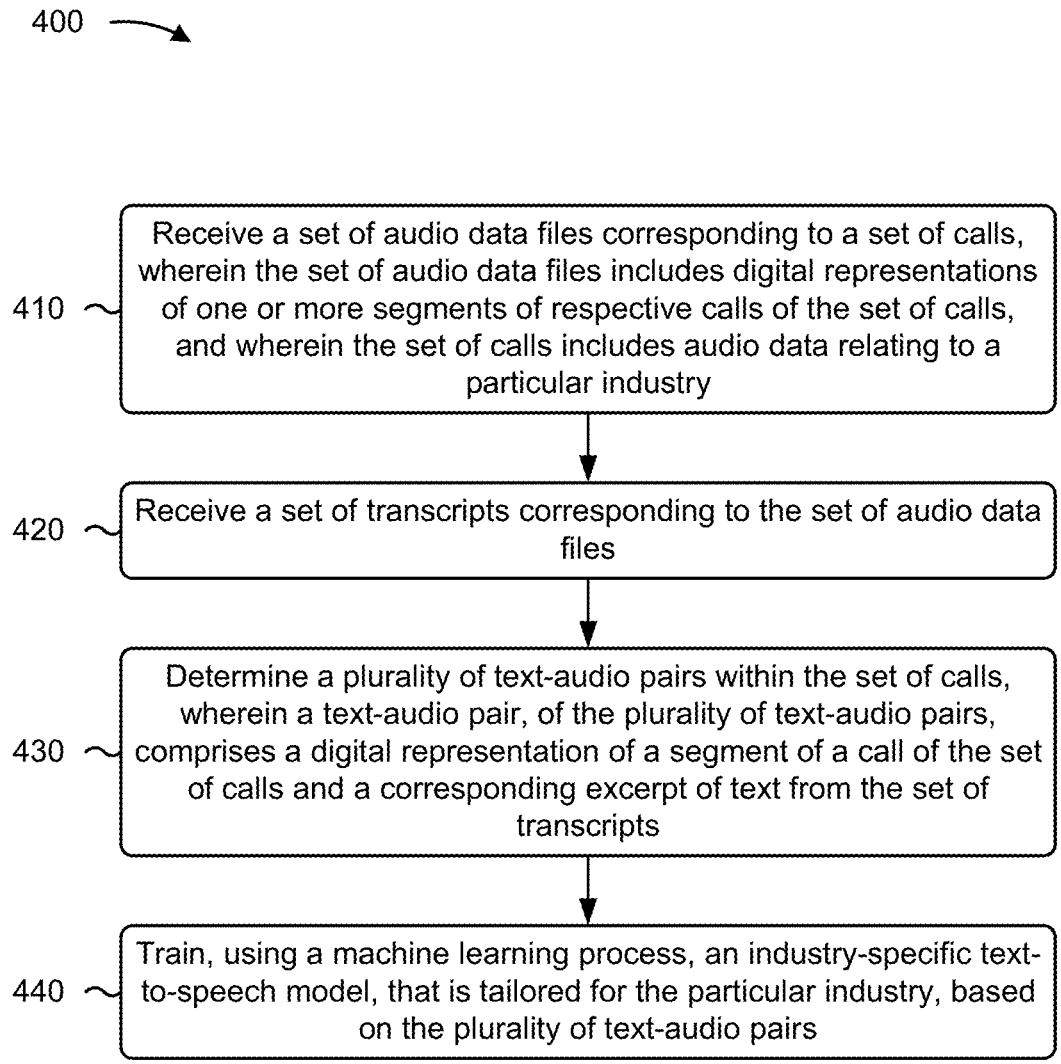

FIG. 4 is a flow chart of an example process 400 for training a text-to-speech model. In some implementations, one or more process blocks of FIG. 4 may be performed by a device (e.g., text-to-speech platform 250). In some implementations, one or more process blocks of FIG. 4 may be performed by another device or a group of devices separate from or including the device, such as a recording device (e.g., call recording device 210), a transcription device (e.g., transcription device 220), a server device (e.g., server device 230), a client device (e.g., client device 240), and/or the like.

As shown in FIG. 4, process 400 may include receiving a set of audio data files corresponding to a set of calls, wherein the set of audio data files includes digital representations of one or more segments of respective calls of the set of calls, and wherein the set of calls includes audio data relating to a particular industry (block 410). For example, the device (e.g., using computing resource 245, processor 320, memory 330, storage component 340, input component 350, output component 360, communication interface 370 and/or the like) may receive a set of audio data files corresponding to a set of calls, as described above. In some implementations, the set of audio data files includes digital representations of one or more segments of respective calls of the set of calls. In some implementations, the set of calls includes audio data relating to a particular industry.

As further shown in FIG. 4, process 400 may include receiving a set of transcripts corresponding to the set of audio data files (block 420). For example, the device (e.g., using computing resource 245, processor 320, memory 330, storage component 340, input component 350, output component 360, communication interface 370, and/or the like) may receive a set of transcripts corresponding to the set of audio data files, as described above.

As further shown in FIG. 4, process 400 may include determining a plurality of text-audio pairs within the set of calls, wherein a text-audio pair, of the plurality of text-audio pairs, comprises a digital representation of a segment of a call of the set of calls and a corresponding excerpt of text from the set of transcripts; and (block 430). For example, the device (e.g., using computing resource 245, processor 320, memory 330, storage component 340, input component 350, output component 360, communication interface 370, and/or the like) may determine a plurality of text-audio pairs within the set of calls, as described above. In some implementations, a text-audio pair, of the plurality of text-audio pairs, comprises a digital representation of a segment of a call of the set of calls, and a corresponding excerpt of text from the set of transcripts.

As further shown in FIG. 4, process 400 may include training, using a machine learning process, an industry-specific text-to-speech model, that is tailored for the particular industry, based on the plurality of text-audio pairs (block 440). For example, the device (e.g., using computing resource 245, processor 320, memory 330, storage component 340, input component 350, output component 360, communication interface 370, and/or the like) may train, using a machine learning process, an industry-specific text-to-speech model, that is tailored for the particular industry, based on the plurality of text-audio pairs, as described above.

Process 400 may include additional implementations, such as any single implementation or any combination of implementations described below and/or in connection with one or more other processes described elsewhere herein.

In a first implementation, the device is a first device, and process 400 further comprises: receiving, from a second device, text for translation to a corresponding audio output; inputting the received text to the industry-specific text-to-speech model to obtain information for the corresponding audio output; and providing, to the second device, the information for the corresponding audio output.

In a second implementation, alone or in combination with the first implementation, the device is a first device, and process 400 further comprises: receiving a query from a second device; determining a response to the query, the response to the query includes a text-based reply; inputting the text-based reply to the industry-specific text-to-speech model to obtain information for an audio output corresponding to the text-based reply; and providing, to the second device, the information for the audio output.

In a third implementation, alone or in combination with one or more of the first and second implementations, the query includes a translation of a digital representation of an audio input received from a user.

In a fourth implementation, alone or in combination with one or more of the first through third implementations, the device is a first device, and process 400 further comprises providing the industry-specific text-to-speech model to a second device of an entity of the particular industry.

In a fifth implementation, alone or in combination with one or more of the first through fourth implementations, a transcript, of the set of transcripts, comprises an excerpt of text and an identification of a corresponding segment of audio data, and determining the plurality of text-audio pairs comprises associating, based on the transcript, the excerpt of text with the corresponding segment of audio data.

In a sixth implementation, alone or in combination with one or more of the first through fifth implementations, the set of calls are associated with a phone operator of a call center, and the call center is associated with an entity that operates within the particular industry.

In a seventh implementation, alone or in combination with one or more of the first through sixth implementations, process 400 further comprises identifying segments, of the one or more segments of the respective calls of the set of calls, associated with speech by the phone operator of the call center, wherein determining the plurality of text-audio pairs within the set of calls comprises determining text-audio pairs for the segments associated with the speech by the phone operator of the call center, and wherein training the industry-specific text-to-speech model is based on the text-audio pairs for the segments associated with the speech by the phone operator of the call center.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for training a text-to-speech model. In some implementations, one or more process blocks of FIG. 5 may be performed by device (e.g., text-to-speech platform 250). In some implementations, one or more process blocks of FIG. 5 may be performed by another device or a group of devices separate from or including the device, such as a recording device (e.g., call recording device 210), a transcription device (e.g., transcription device 220), a server device (e.g., server device 230), a client device (e.g., client device 240), and/or the like.

As shown in FIG. 5, process 500 may include receiving a set of audio data files corresponding to a set of calls, wherein the set of audio data files includes digital representations of one or more segments of respective calls of the set of calls, and wherein the set of calls includes audio data relating to a particular industry (block 510). For example, the device (e.g., using computing resource 245, processor 320, memory 330, storage component 340, input component 350, output component 360, communication interface 370 and/or the like) may receive a set of audio data files corresponding to a set of calls, as described above. In some implementations, the set of audio data files includes digital representations of one or more segments of respective calls of the set of calls. In some implementations, the set of calls includes audio data relating to a particular industry.

As further shown in FIG. 5, process 500 may include determining a plurality of text-audio pairs within the set of calls, wherein a text-audio pair, of the plurality of text-audio pairs, comprises a digital representation of a segment of a call of the set of calls and a corresponding excerpt of text transcribed from the call; and (block 520). For example, the device (e.g., using computing resource 245, processor 320, memory 330, storage component 340, input component 350, output component 360, communication interface 370 and/or the like) may determine a plurality of text-audio pairs within the set of calls, as described above. In some implementations, a text-audio pair, of the plurality of text-audio pairs, comprises a digital representation of a segment of a call of the set of calls, and a corresponding excerpt of text transcribed from the call.

As further shown in FIG. 5, process 500 may include training, using a machine learning process, an industry-specific text-to-speech model, that is tailored for the particular industry, based on the plurality of text-audio pairs (block 530). For example, the device (e.g., using computing resource 245, processor 320, memory 330, storage component 340, input component 350, output component 360, communication interface 370 and/or the like) may train, using a machine learning process, an industry-specific text-to-speech model, that is tailored for the particular industry, based on the plurality of text-audio pairs, as described above.

Process 500 may include additional implementations, such as any single implementation or any combination of implementations described below and/or in connection with one or more other processes described elsewhere herein.

In a first implementation, process 500 includes providing the industry-specific text-to-speech model to a client device, wherein the industry-specific text-to-speech model is operable to translate received text into a corresponding audio output for use by a virtual assistant.

In a second implementation, alone or in combination with the first implementation, the device is a first device, and process 500 further includes receiving, from a second device, text for translation to a corresponding audio output; inputting the received text to the industry-specific text-to-speech model to obtain information for the corresponding audio output; and providing, to the second device, the information for the corresponding audio output.

In a third implementation, alone or in combination with one or more of the first and second implementations, process 500 further includes receiving text for translation to a corresponding audio output; inputting the text to the industry-specific text-to-speech model to obtain information for the corresponding audio output; and training a speech-to-text model based on the information for the corresponding audio output.

In a fourth implementation, alone or in combination with one or more of the first through third implementations, the plurality of text-audio pairs comprises one or more text audio pairs corresponding to an industry-specific vocabulary, and wherein the one or more processors are further configured to train the industry-specific text-to-speech model based on the one or more text audio pairs corresponding to the industry-specific vocabulary.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
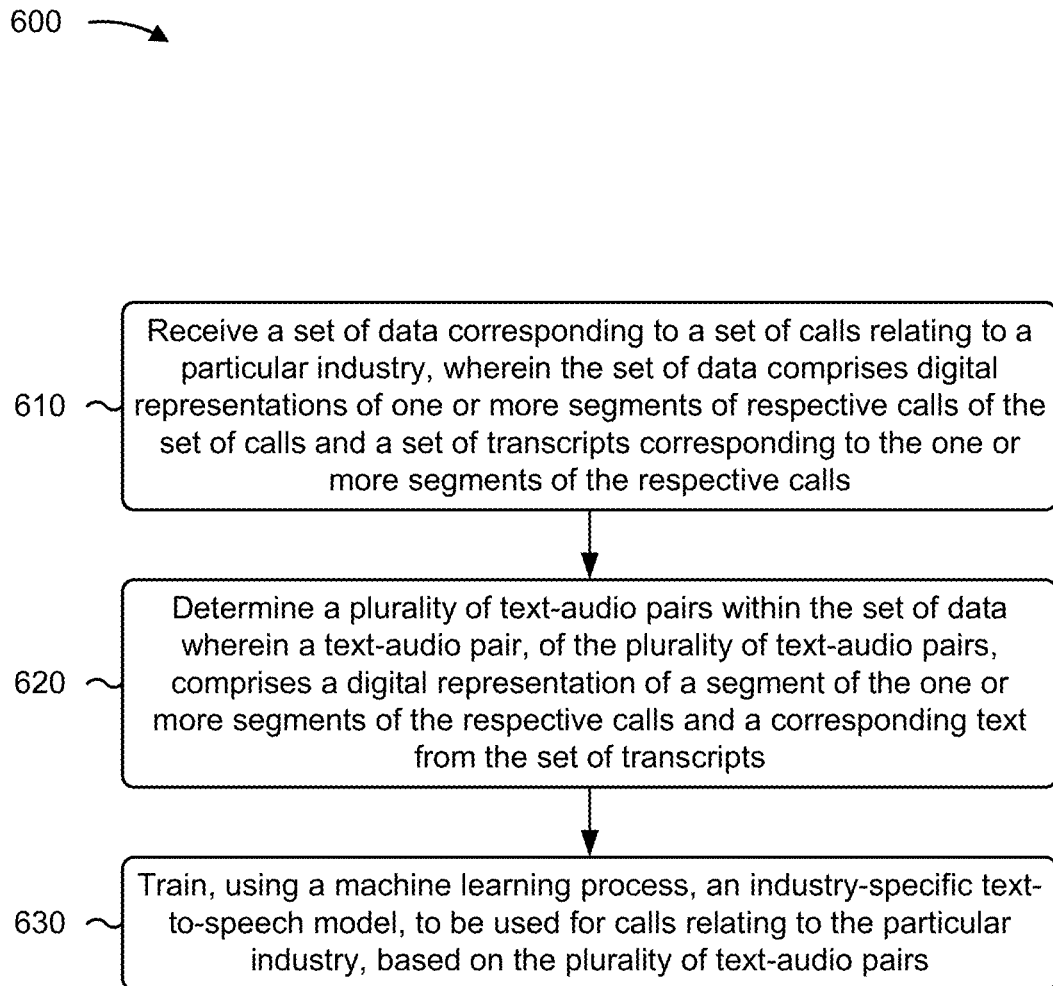

FIG. 6 is a flow chart of an example process 600 for training a text-to-speech model. In some implementations, one or more process blocks of FIG. 6 may be performed by device (e.g., text-to-speech platform 250). In some implementations, one or more process blocks of FIG. 6 may be performed by another device or a group of devices separate from or including the device, such as a recording device (e.g., call recording device 210), a transcription device (e.g., transcription device 220), a server device (e.g., server device 230), a client device (e.g., client device 240), and/or the like.

As shown in FIG. 6, process 600 may include receiving a set of data corresponding to a set of calls relating to a particular industry, wherein the set of data comprises digital representations of one or more segments of respective calls of the set of calls and a set of transcripts corresponding to the one or more segments of the respective calls (block 610). For example, the device (e.g., using computing resource 245, processor 320, memory 330, storage component 340, input component 350, output component 360, communication interface 370 and/or the like) may receive a set of data corresponding to a set of calls relating to a particular industry, as described above. In some implementations, the set of data comprises digital representations of one or more segments of respective calls of the set of calls, and a set of transcripts corresponding to the one or more segments of the respective calls.

As further shown in FIG. 6, process 600 may include determining a plurality of text-audio pairs within the set of data, wherein a text-audio pair, of the plurality of text-audio pairs, comprises a digital representation of a segment of the one or more segments of the respective calls and a corresponding text from the set of transcripts; and (block 620). For example, the device (e.g., using computing resource 245, processor 320, memory 330, storage component 340, input component 350, output component 360, communication interface 370 and/or the like) may determine a plurality of text-audio pairs within the set of data, as described above. In some implementations, a text-audio pair, of the plurality of text-audio pairs, comprises a digital representation of a segment of the one or more segments of the respective calls, and a corresponding text from the set of transcripts.

As further shown in FIG. 6, process 600 may include training, using a machine learning process, an industry-specific text-to-speech model, to be used for calls relating to the particular industry, based on the plurality of text-audio pairs (block 630). For example, the device (e.g., using computing resource 245, processor 320, memory 330, storage component 340, input component 350, output component 360, communication interface 370 and/or the like) may train, using a machine learning process, an industry-specific text-to-speech model, to be used for calls relating to the particular industry, based on the plurality of text-audio pairs, as described above.

Process 600 may include additional implementations, such as any single implementation or any combination of implementations described below and/or in connection with one or more other processes described elsewhere herein.

In a first implementation, process 600 further includes receiving, from a device, text for translation to a corresponding audio output; inputting the received text to the industry-specific text-to-speech model to obtain information for the corresponding audio output; and providing, to the device, the information for the corresponding audio output.

In a second implementation, alone or in combination with the first implementation, process 600 further includes receiving a query from a device; determining a response to the query, wherein the respond to the query includes a text-based reply; inputting the text-based reply to the industry-specific text-to-speech model to obtain information for an audio output corresponding to the text-based reply; and providing, to the device, the information for the audio output.

In a third implementation, alone or in combination with one or more of the first and second implementations, process 600 further includes providing the industry-specific text-to-speech model to a client device, wherein the industry-specific text-to-speech model is operable to translate received text into a corresponding audio output for use by a virtual assistant.

In a fourth implementation, alone or in combination with one or more of the first through third implementations, process 600 further includes identifying, within a transcript of the set of transcripts, an excerpt of text and an identification of a corresponding segment of audio data; and determining a text-audio pair, of the plurality of text-audio pairs, by associating, based on the transcript, the excerpt of text with the corresponding segment of audio data.

In a fifth implementation, alone or in combination with one or more of the first through fourth implementations, the respective calls of the set of calls are associated with a phone operator of a call center, and wherein the call center is associated with an entity that operates within the particular industry.

In a sixth implementation, alone or in combination with one or more of the first through fifth implementations, process 600 further includes identifying segments, of the one or more segments of the respective calls of the set of calls, associated with speech by the phone operator of the call center, wherein determining the plurality of text-audio pairs within the set of calls comprises determining text-audio pairs for the segments associated with the speech by the phone operator of the call center, and wherein training the industry-specific text-to-speech model is based on the text-audio pairs for the segments associated with the speech by the phone operator of the call center.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a first device, a set of audio data files corresponding to a set of calls,
      wherein the set of audio data files includes digital representations of one or more segments of respective calls of the set of calls;
   determining, by the first device, a plurality of text-audio pairs within the set of calls;
   training, by the first device and using a machine learning process, a text-to-speech model based on the plurality of text-audio pairs;
   receiving, by the first device, a query from a second device;
   selecting, by the first device, a text-to-speech library from a plurality of libraries based on information associated with the query,
      the text-to-speech library providing an audio output based on one or more of:
         dialect, rate of speech, tone, or language associated with the query;
   inputting, by the first device, a text-based reply to the query to the text-to-speech model to obtain information for the audio output corresponding to the text-based reply; and
   providing, by the first device and to the second device, the information for the audio output,
      wherein the audio output is used for providing an audible response.

2. The method of claim 1, further comprising:
   determining a response to the query,
      wherein the response to the query includes the text-based reply.

3. The method of claim 1, where training the text-to-speech model based on the plurality of text-audio pairs within the set of calls comprises:
   training the text-to-speech model using the plurality of text-audio pairs corresponding to industry-specific vocabulary.

4. The method of claim 1, further comprising:
   receiving a set of transcripts corresponding to the set of audio data files; and
   determining the plurality of text-audio pairs within the set of calls,
      wherein a text-audio pair, of the plurality of text-audio pairs, comprises:
         a digital representation of a segment of a call of the set of calls, and
         a corresponding excerpt of text from the set of transcripts.

5. The method of claim 1, further comprising:
   determining context of a text-audio pair, of the plurality of text-audio pairs, based on one or more characteristics of a segment of audio data in the text-audio pair.

6. The method of claim 1, further comprising:
   identifying a text-audio pair, of the plurality of text-audio pairs, between a segment of a waveform of audio data and an excerpt of a corresponding transcript.

7. A device, comprising:
   one or more memories; and
   one or more processors, communicatively coupled to the one or more memories, configured to:
      receive a set of audio data files corresponding to a set of calls,
         wherein the set of audio data files includes digital representations of one or more segments of respective calls of the set of calls;
      determine a plurality of text-audio pairs within the set of calls;
      train, using a machine learning process, a text-to-speech model based on the plurality of text-audio pairs;
      receive a query from a second device;
      select a text-to-speech library from a plurality of libraries based on information associated with the query, the text-to-speech library providing an audio output based on one or more of:
  dialect, rate of speech, tone, or language associated with the query;
input a text-based reply to the query to the text-to-speech model to obtain information for the audio output corresponding to the text-based reply using a text-to-speech library associated with the text-to-speech model; and
provide, to the second device, the information for the audio output,
  wherein the audio output is used for providing an audible response.

8. The device of claim 7, wherein the one or more processors, when inputting the text-based reply to the query to the text-to-speech model to obtain the information for the audio output corresponding to the text-based reply are to:
  determine alternative phrasing or vocabulary, using excerpts of text stored in the text-to-speech library, to express a substantially similar meaning as that contained in the text-based reply.

9. The device of claim 7, wherein the one or more processors, when training the text-to-speech model based on the plurality of text-audio pairs within the set of calls, are to:
  receive text for transcription to a corresponding audio output;
  input the text to the text-to-speech model to obtain information for the corresponding audio output; and
  train the text-to-speech model based on the information for the corresponding audio output generated by the text-to-speech model.

10. The device of claim 7, wherein the one or more processors are further configured to:
  receive a set of transcripts corresponding to the set of audio data files; and
  determine the plurality of text-audio pairs within the set of calls,
    wherein a text-audio pair, of the plurality of text-audio pairs, comprises:
      a digital representation of a segment of a call of the set of calls, and
      a corresponding excerpt of text from the set of transcripts.

11. The device of claim 7, wherein the one or more processors are further configured to:
  determine context of a text-audio pair, of the plurality of text-audio pairs, based on one or more characteristics of a segment of audio data in the text-audio pair.

12. The device of claim 7, wherein the one or more processors, when receiving the query from the second device, are to:
  determine whether the query is associated with a user account; and
  determine that the second device provided valid credentials to receive information related to the user account.

13. A non-transitory computer-readable medium storing instructions, the instructions comprising:
  one or more instructions that, when executed by one or more processors, cause the one or more processors to:
    receive a set of audio data files corresponding to a set of calls;
    determine a plurality of text-audio pairs within the set of calls;
    train, using a machine learning process, a text-to-speech model based on the plurality of text-audio pairs;
    receive a query from a second device;
    select a text-to-speech library from a plurality of libraries based on information associated with the query, the text-to-speech library providing an audio output based on one or more of:
      dialect, rate of speech, tone, or language associated with the query;
    input a text-based reply to the query to the text-to-speech model to obtain information for the audio output corresponding to the text-based reply; and
    provide, to the second device, an audible response for the audio output.

14. The non-transitory computer-readable medium of claim 13, wherein the query is a digital representation of an audio input; and
  wherein the one or more instructions, when executed by the one or more processors, further cause the one or more processors to:
    transcribe the transcribe the digital representation of the audio input into text using a speech-to-text model.

15. The non-transitory computer-readable medium of claim 13, wherein the one or more instructions, when executed by the one or more processors, further cause the one or more processors to:
  determine a response to the query,
    wherein the response to the query includes the text-based reply.

16. The non-transitory computer-readable medium of claim 13, wherein the one or more instructions, when executed by the one or more processors, further cause the one or more processors to:
  receive a set of transcripts corresponding to the set of audio data files; and
  determine the plurality of text-audio pairs within the set of calls,
    wherein a text-audio pair, of the plurality of text-audio pairs, comprises:
      a digital representation of a segment of a call of the set of calls, and
      a corresponding excerpt of text from the set of transcripts.

17. The non-transitory computer-readable medium of claim 13, wherein the one or more instructions, when executed by the one or more processors, further cause the one or more processors to:
  determine context of a text-audio pair, of the plurality of text-audio pairs, based on one or more characteristics of a segment of audio data in the text-audio pair.

18. The non-transitory computer-readable medium of claim 13, wherein the one or more instructions, when executed by the one or more processors, further cause the one or more processors to:
  identify one or more segments based on patterns within the set of audio data files.

19. The method of claim 1, wherein the information associated with the query includes information identifying a region where a user of the second device is located.

20. The device of claim 7, wherein the set of calls includes audio data relating to a particular industry.

* * * * *